UNITED STATES PATENT OFFICE.

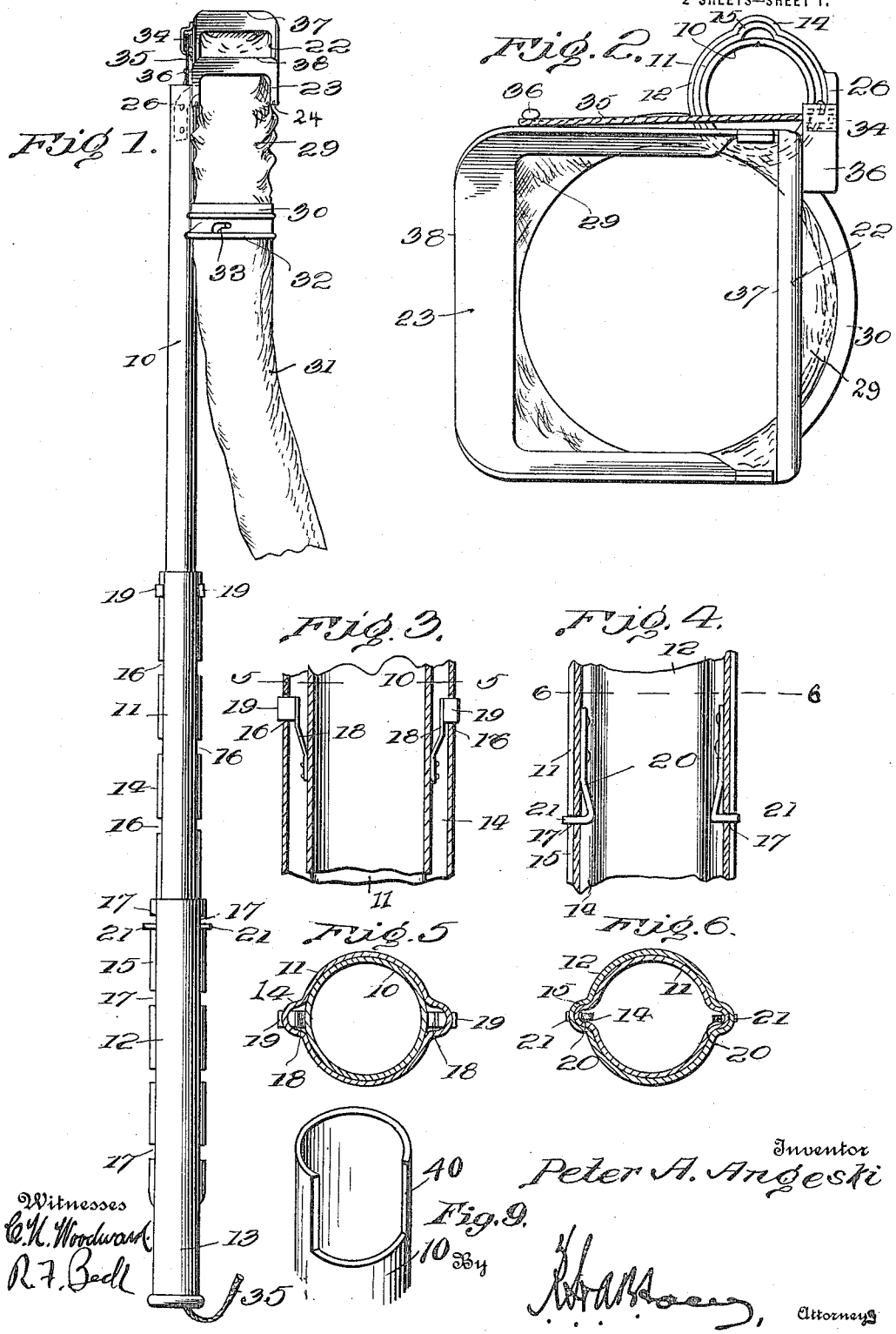

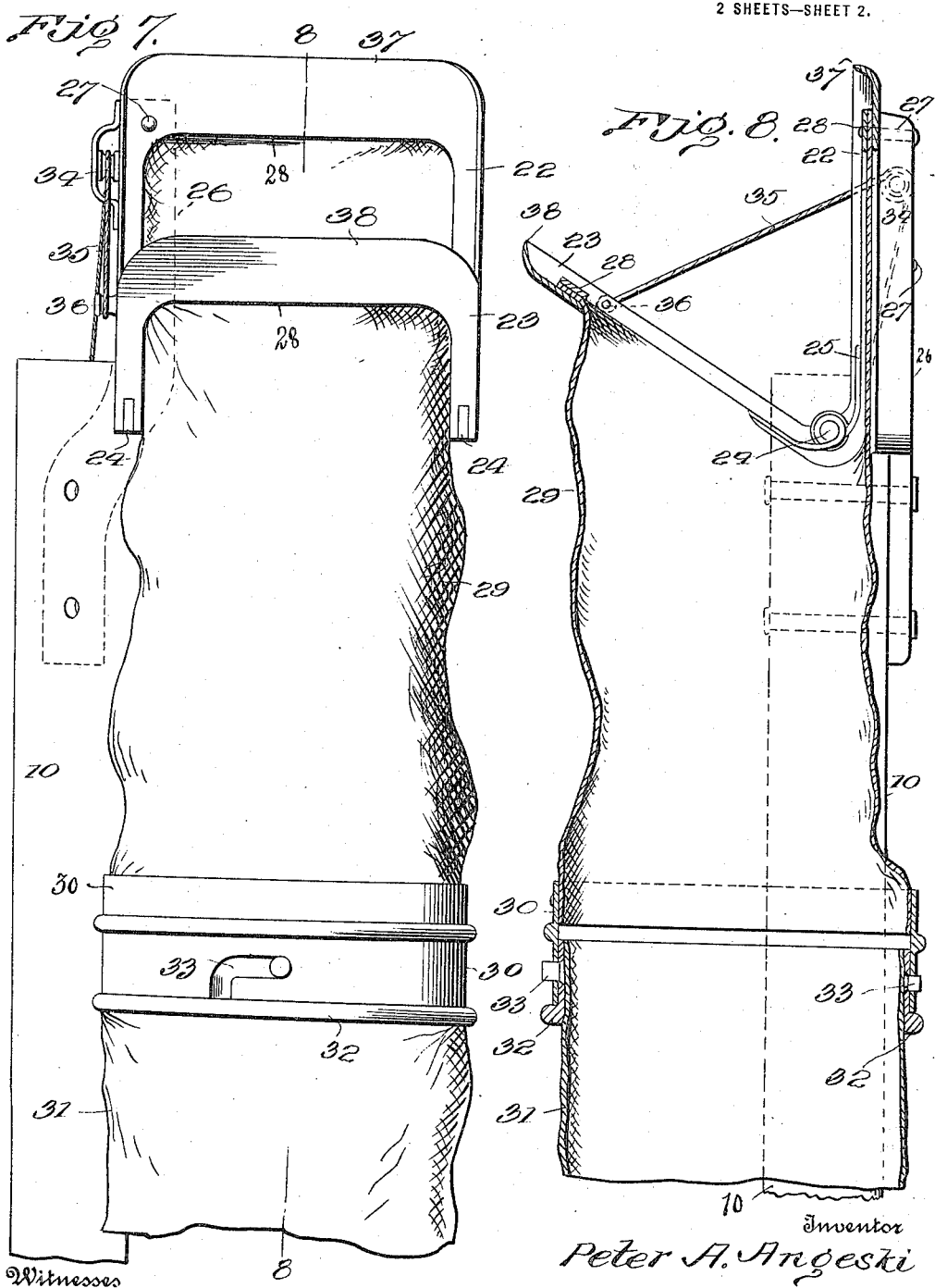

PETER A. ANGESKI, OF LILLY, PENNSYLVANIA.

FRUIT-PICKER.

1,158,158. Specification of Letters Patent. Patented Oct. 26, 1915.

Application filed January 21, 1915. Serial No. 3,648.

*To all whom it may concern:*

Be it known that I, PETER A. ANGESKI, a citizen of the United States, residing at Lilly, in the county of Cambria and State of Pennsylvania, have invented certain new and useful Improvements in Fruit-Pickers, of which the following is a specification.

This invention relates to devices for picking fruit of the class having a supporting standard, a picker element carried by the standard, and a flexible conductor leading from the picker element to a suitable receptacle near the ground, and has for one of its objects to simplify and improve the construction and increase the efficiency and utility of devices of this character.

Another object of the invention is to provide a simply constructed device having a longitudinally adjustable handle or support whereby the device may be adjusted to fruit growing at various heights from the ground.

A further object of the invention is to provide a simply constructed device in which the flexible conductor element is adjustable to enable the fruit to be deposited in receptacles located in various positions relative to the ground and to the picker device.

With these and other objects in view, the invention consists in certain novel features of construction as hereinafter shown and described, and then specifically pointed out in the claims; and in the drawings illustrative of the preferred embodiment of the invention Figure 1 is a side elevation of the improved device; Fig. 2 is a plan view enlarged; Figs. 3 and 4 are enlarged sectional details of the adjustable handle device illustrating its construction; Fig. 5 is a transverse section on the line 5—5 of Fig. 3; Fig. 6 is a transverse section on the line 6—6 of Fig. 4; Fig. 7 is an enlarged front elevation of the fruit severing portion of the device; Fig. 8 is a section on the line 8—8 of Fig. 7; Fig. 9 is a detached perspective view of the upper portion of the upper handle section, illustrating the arrangement and location of the stop recess.

Corresponding and like parts are referred to in the following description and indicated in all the views of the accompanying drawings by the same reference characters.

The improved device includes an adjustable handle portion, preferably formed of sections of piping and telescopically united so that the handle may be lengthened or shortened as required. Any required number of the tubular sections may be employed, but for the purpose of illustration three are shown, but it is not desired to limit the invention to any specific number of handle sections. The three sections employed for illustration are designated by the characters 10—11—12, the section 10 carrying the picker mechanism and the section 12 terminating in a hand grip portion 13. The tubular section 10 is formed from a straight portion of piping, while the sections 11 and 12 are formed with laterally directed ribs 14—15, the ribs 14 operating within the ribs 15, as shown. By this means the section 11 is prevented from rotating within the section 12, while at the same time the ribs 14—15 form recesses for the reception of the locking members between the sections 10—11 and the sections 11—12. The ribs 14 are formed with lateral openings 16 spaced apart, while the ribs 15 are provided with similar openings 17 spaced apart, the openings forming seats for the catch devices, as hereinafter explained.

Connected to the lower end of the section 10 are springs 18 carrying lugs 19 at their free ends adapted to engage consecutively in the openings 16 and thus form spring-controlled catches between the members 10—11 to hold the latter at any desired point within the range of the openings 16. The springs 18 and the lugs 19 operate entirely within the hollows of the ribs 14, as illustrated in Figs. 3 and 5.

Connected near the lower end of the member 11 are spring catches 20 having outwardly directed terminals 21, the latter adapted to engage consecutively through the apertures 17 and thus form spring catches to connect the members 11—12 at intervals within the range of the apertures 17. The lugs 19 and the projections 21 are movable inwardly manually from the outside when the tubular members are to be adjusted. By this simple means, the handle portion of the device may be adjusted longitudinally to any desired extent within the range of the apertures 16—17, and when the tubular sections are fully closed, the improved device occupies a relatively small space which is very convenient for shipping or storage.

The fruit serving portion of the improved device comprises two substantially inverted U-shaped members 22—23 hingedly united at their lower ends at 24, each of the frame members thus including sides spaced apart. Springs, one of which is represented at 25, are applied to the members 22—23 to maintain them yieldably in separated position, or in the position shown in Figs. 7 and 8. At its upper end the handle member 10 is provided with a recess 40, and rising from the tubular section 10 adjacent to the recess is a standard 26, and one of the side portions of the frame member 22 is rigidly connected to the standard by a rivet or other suitable fastening device 27 and projects into the recess, as shown. The member 23 is thus movable away from and toward the member 22 and is limited in its outward movement by contacting with the recess 40. Connected at 28 to the frame members 22—23 and extending entirely around the interior of the same is a flexible conductor element 29 of suitable fabric and tubular in form. The member 29 may be of any required length, but is preferably relatively short and is provided with a coupling member or band 30 at its lower end. By this arrangement, the fruit impacts against the portion of the fabric member which is attached to the frame member 22, which thus forms a yieldable cushion to the fruit at one side while the portion of the fabric material which is attached to the frame member 23 is engaged by the fruit at the opposite side when the implement is used and prevents injury to the fruit. Another tubular conductor member of suitable fabric, represented at 31, is provided with a coupling member or band 32 adapted to telescopically engage the member 30, the two members 30—32 being detachably united, as by a bayonet joint represented conventionally at 33. By this means, the two members 29—31 may be quickly united or separated, as may be preferred. The member 31 may be of any required length, and a plurality of members 31 may be employed at varying lengths to be connected to the member 29 as required. The member 31 is designed to conduct fruit into a suitable receptacle, such as a bag, basket, wagon body, crate, or like device, but as this receptacle forms no part of the present invention, it is not deemed necessary to illustrate the same.

Connected to the standard 26 is a guide pulley 34 over which a pull cord 35 leads and connected at one end at 36 to the frame member 23 and leading thence through the tubular members 10—11—12 to a point convenient to the hand of the operator. The outer edges of the members 22—23 are curved toward each other and sharpened, as represented at 37—38, to cause the stems of the fruit to be severed when the member 23 is actuated.

With the device thus constructed, the operation is as follows: The handle sections 10—11—12 are adjusted to the height of the fruit upon the tree, as before described, and the open space between the jaw members 22—23 passed over the fruit to be severed which places the stem of the fruit between the cutting portions 37—38. The body portions of the fruit come in contact only with the fabric which is located within the frame members 22—23 which thus serves as a cushion to prevent injury to the fruit, as before described. Then, when the pull cord 35 is actuated, the member 23 is moved toward the member 22, against the resistance of the spring 25, and the stem on the fruit is severed by the jaw edges 37—38, the fruit dropping into the conductor member 29 and thence conveyed through the conductor member 31 to the receptacle. After the pull cord 35 is released, the spring 25 will restore the jaw member 23 to its former position in contact with the bottom of the recess 40 and, ready for the next operation.

The improved device is simple in construction, can be inexpensively manufactured and of any required or desired size to adapt the device to different sizes of fruits or like products.

Having thus described the invention, what is claimed as new is:—

1. In a device of the character described, a handle member having a laterally and upwardly opening recess and forming a stop shoulder, a stem severing device comprising co-acting members each including a transverse cutting member and spaced sides hingedly united, means for connecting one of said co-acting members to the handle within the recess thereof and leaving the other co-acting member movable upon its hinged connection and limited in its movement in one direction by the stop shoulder, a flexible tubular conductor connected to said co-acting members, and means for actuating the movable co-acting member.

2. In a device of the character described, a handle member having a laterally and upwardly opening recess which forms a stop shoulder, a stem severing device comprising a stationary member and a movable member, said members having co-acting cutting edges and the movable member operating at one side within the recess and limited in its movement in one direction by the stop shoulder portion of the recess, a flexible tubular conductor connected to said co-acting members, and means for actuating the movable co-acting member.

3. In a device of the character described, a handle formed of a plurality of tubular sections telescopically disposed and provided with lateral ribs, said ribs having apertures spaced apart, a stem severing device carried by one of said handle members, a tubular conductor connected to said severing device, and spring catches carried by said tubular handle sections and operating through said apertures.

In testimony whereof I affix my signature in presence of two witnesses.

PETER A. ANGESKI. [L. S.]

Witnesses:
 JOHN ANGESKI,
 JOHN GREEN.

Copies of this patent may be obtained for five cents each, by addressing the "Commissioner of Patents, Washington, D. C."